March 11, 1930.  J. WALTER  1,750,554
BUSHING FOR LINING THE BORES OF JOINTS
Filed Jan. 6, 1927
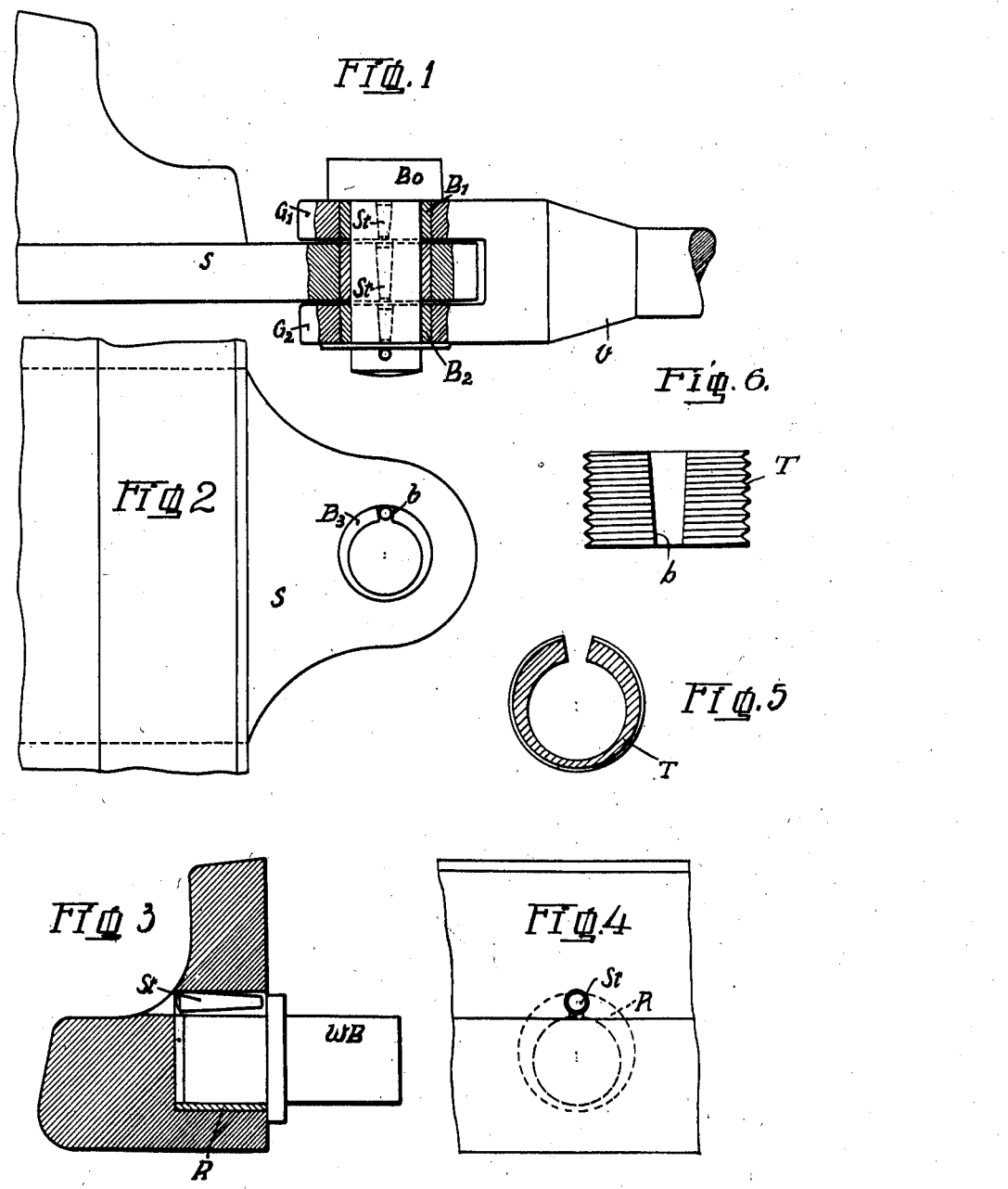
J. Walter
INVENTOR
By: Marks & Clerk
Attys.

Patented Mar. 11, 1930

1,750,554

UNITED STATES PATENT OFFICE

JOSEF WALTER, OF MODLING, AUSTRIA

BUSHING FOR LINING THE BORES OF JOINTS

Application filed January 6, 1927, Serial No. 159,432, and in Austria January 11, 1926.

I have filed applications in Austria January 11, 1926; Hungary July 22, 1926; Czechoslovakia July 22, 1926; Germany July 22, 1926; and Poland August 31, 1926.

The joints or links of operating and connecting rods or the like of railway-shunts are subjected to blows and shocks and thus to great wear when setting the shunt or when a train or the like travels over the same. In consequence thereof the small clearance or play in the joints, which is necessary at the beginning, is gradually increased and the expenses for keeping the joints in proper condition are very great, because in many cases, for instance for maintaining the gauge, the correct distance of the conical rails has to be maintained exactly.

Such joint or hinged connections mostly consist of a connecting rod, which is forked at both ends, and of a hinged member, which is riveted to each of the two conical rails.

The connection of the forked member and hinged member is carried out by a screw-threaded bolt. However as the bolt is disposed with play in the holes or bores of the forked member, as well as of the hinged member, not only the bores of the said members but also the bolt is subjected to great wear. If the wear has attained the permissible limit, the same has to be attended to and removed. Up to now this is carried out for instance in such a manner, that the bores of the forked member and of the hinged member are enlarged and a new bolt of a larger diameter is passed therethrough. Besides the troublesome work, which mainly has to be carried out on the track and which is not and cannot be carried out with the necessary accuracy and care, this renewal of the bolt cannot be repeated very often, because the thickness of the wall of the forked member and hinged member becomes gradually smaller and therefore the said members cannot be used any more for the reason of safety. However the renewal of the connecting rod and hinged member is very expensive and further also the costs of fitting these new parts to the shunt are to be added.

According to the present invention these drawbacks are removed in that the principal members, in this case the connecting rod and the two hinge-members are maintained without alteration and the contacting places, which are subjected to wear, are replaced by readily removable and exchangeable parts, which are not expensive to manufacture and can be fitted at small costs.

Three modes of carrying out the present invention are illustrated by way of example on the accompanying sheet of drawings in which—

Figs. 1 and 2 show in sectional elevation and plan view respectively the arrangement in the case of the known forked connecting rods and the known hinged members.

Figs. 3 and 4 illustrate the application of a removable bushing to the root of a conical rail, and Fig. 5 is a cross-sectional view of a modified construction of the bushing.

Fig. 6 is a side elevation of the modified bushing shown in Fig. 5.

The forked ends $G^1$ and $G^2$ of the connecting rod V and the hinged member S are provided with a hole or bore, which is adapted to the shape of the eccentrically shaped bushings $B^1$, $B^2$ and $B^3$. At the thickest part, each bushing is provided with a wedge-shaped slot $b$ for the reception of a pin $S^t$. On forcing the pin into the bushing, the latter is forced apart in such a manner, that its outer surface rests firmly, e. g. without play, against the wall of the bore of the forked member and the hinged member respectively, thereby rendering impossible any wear of the said bore. Only the bushings $B^1$, $B^2$, $B^3$, through which passes the bolt $Bo$ with little play, are subjected to wear and have to be renewed. The pin $S^t$ is knocked out, whereby the tension of the bushing is relaxed, so that the latter can be readily removed (Figs. 1 and 2).

In the construction shown in Figs. 3 and 4, a slotted eccentrically shaped ring R is fitted into the root of a conical rail. In the same way as in the embodiment shown in Fig. 1, the ring R is pressed without play against the cylindric bore of the conical rail and protects the said bore against wear of any kind and thus the conical rail does not need to be replaced by a new rail except other circumstances call for it. In case the play of the joint has become too large, it is only necessary to renew the eccentric ring R or the root-pin WB, the outer end of which rests immovably in the root-bearing.

In order to secure the bushing in the bore against displacement in the axial direction the former may be provided with an outer screw-thread T (Fig. 5), which cooperates with a corresponding screw-thread, provided in the bore to be lined.

I claim—

1. An arrangement for lining the bores of joints particularly for use in connection with railway shunts including a one piece bushing having a slot extending parallel to its axis, the walls of said slot extending in converging planes in the axial direction of the bushing, and a wedge member adapted to be driven into the slot in the axial direction of the bushing whereby to cause the latter to firmly press against the wall of a member receiving it, and external screw threads on said bushing adapted to be fitted into a member receiving the latter.

2. An arrangement for lining the bores of joints including a one piece bushing having a slot extending parallel to its axis, the walls of said slot extending in converging planes in the axial direction of the bushing and the confronting faces of the slot being plane and diverging outwardly in the radial direction from the central zone of the bushing, and a wedge member adapted to be driven into the slot in the axial direction of the bushing whereby to cause the latter to firmly press against the wall of a member receiving it, the radial divergence of the slot walls causing the wedge member, during driving, to move outwardly from the center of the bushing.

In testimony whereof I affix my signature.
JOSEF WALTER.